Nov. 3, 1964  H. B. SMITH  3,155,973
MULTIPLE PULSE REPETITION FREQUENCY AUTOMATIC
RANGE TRACKING PULSE DOPPLER RADAR
Filed June 13, 1956  4 Sheets-Sheet 4

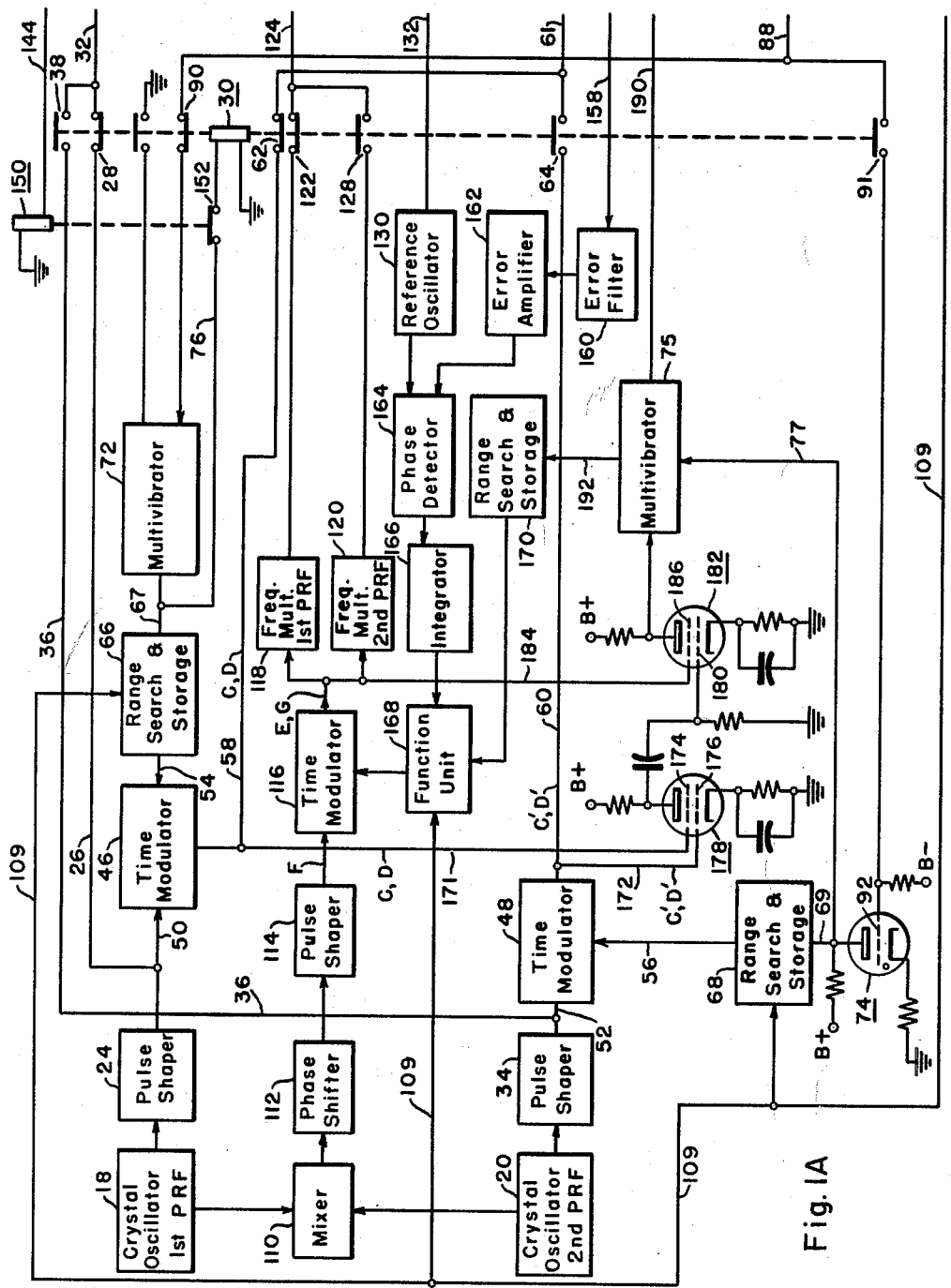
Fig. IA

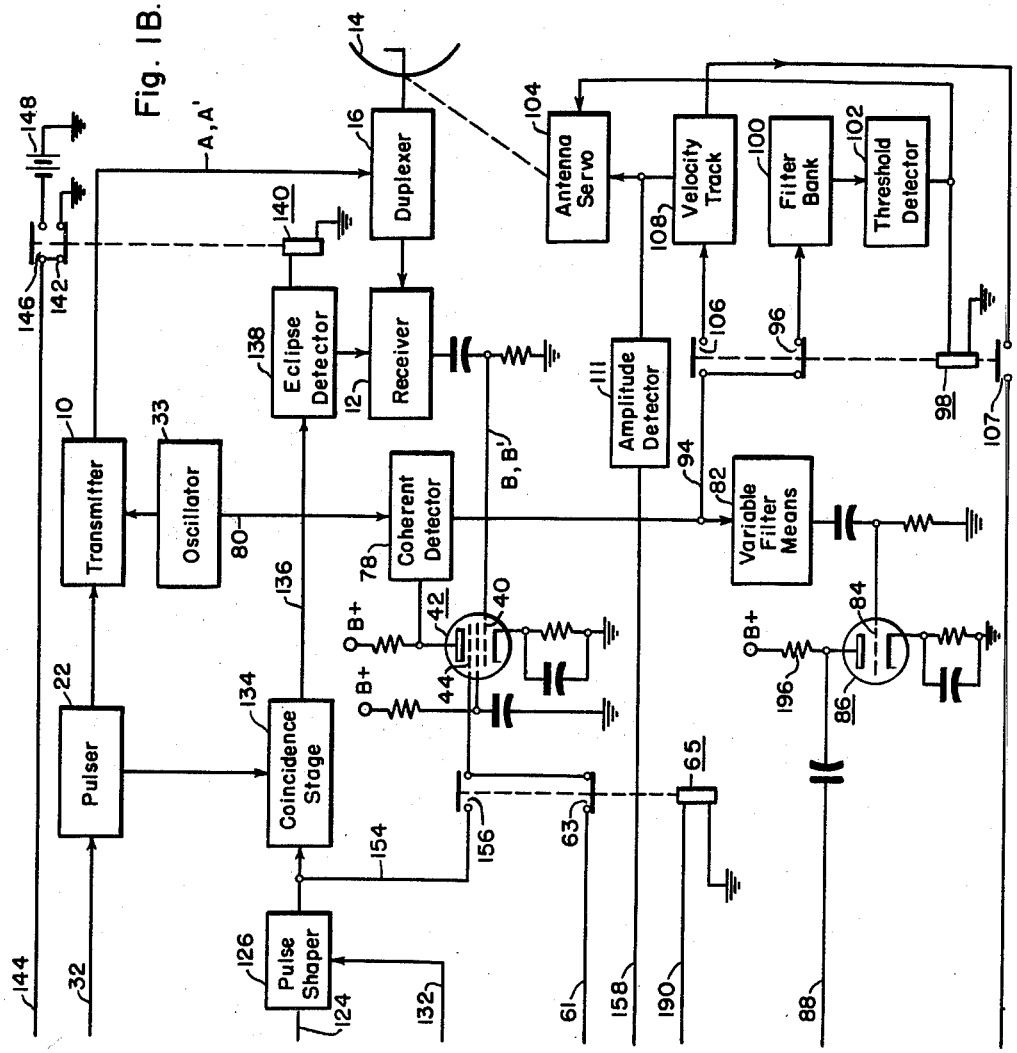

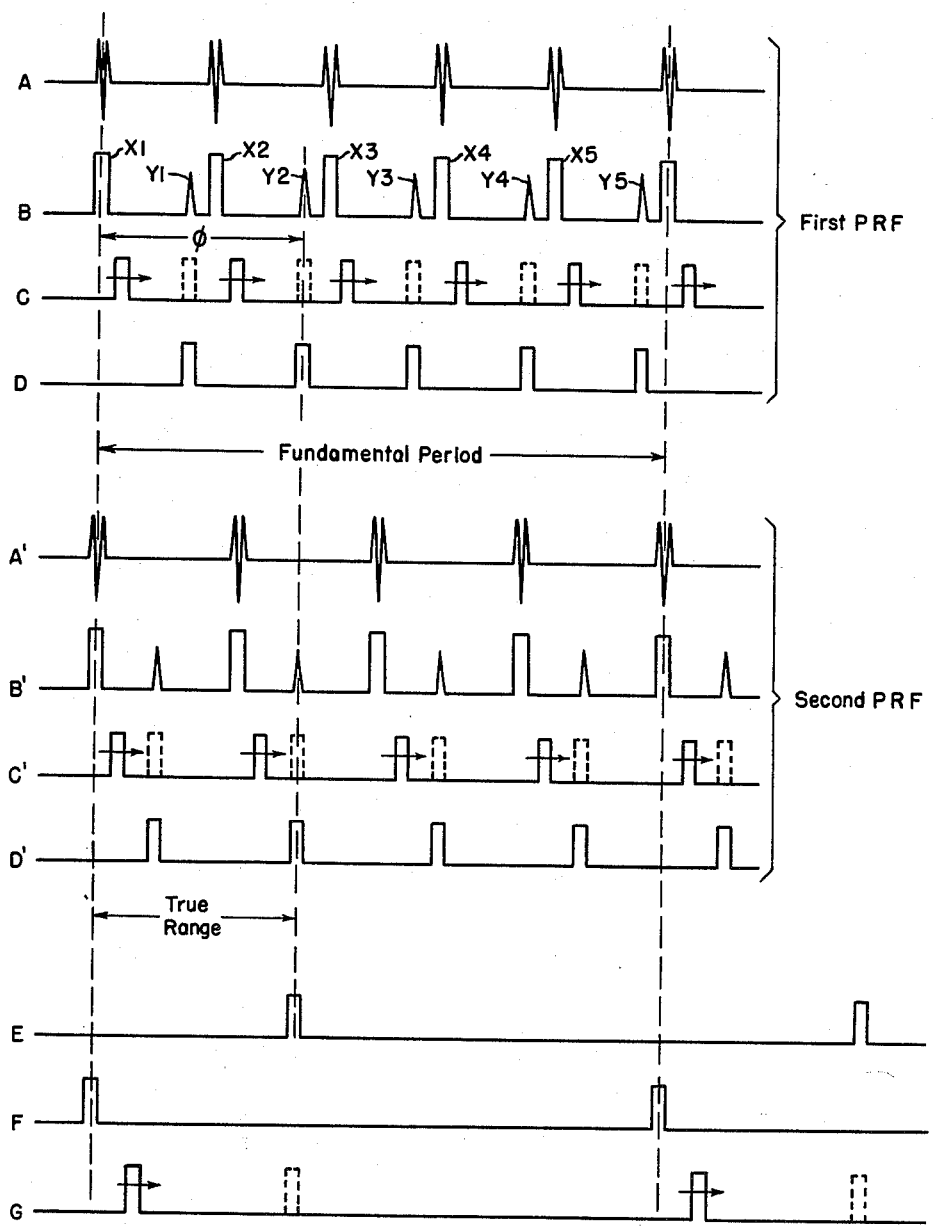

United States Patent Office 3,155,973
Patented Nov. 3, 1964

3,155,973
MULTIPLE PULSE REPETITION FREQUENCY AUTOMATIC RANGE TRACKING PULSE DOPPLER RADAR
Harry B. Smith, Catonsville, Md., assignor to Westinghouse Electric Corporation, East Pittsburgh, Pa., a corporation of Pennsylvania
Filed June 13, 1956, Ser. No. 592,233
2 Claims. (Cl. 343—17.1)

This invention relates to pulse Doppler radar systems and more particularly to the automatic range tracking portion of a pulse Doppler radar system employing multiple values of the transmitted pulse repetition frequency.

In a copending application Serial No. 570,444, filed March 9, 1956, now Patent No. 3,023,409, and assigned to the assignee of the present application, there is described a pulse Doppler radar system in which two values of the transmitted pulse repetition frequency are employed having a common submultiple. Initially, when the radar antenna of the aforesaid system is searching for a target, the first pulse repetition frequency is used. When a target is detected in the searching process, the antenna stops. At the same time, a tracking gate is produced which, in effect, is a series of voltage pulses which have the same pulse repetition frequency and phase position as the target returns at this first pulse repetition frequency. The relative position of this gate is stored in a memory circuit by means of a direct current voltage. Then, the frequency of the transmitted pulses is shifted to the second pulse repetition frequency and a second tracking gate is produced and its position is stored in a memory circuit. If the two tracking gates are passed through a coincidence gate, they will coincide periodically and produce an output pulse. True range is determined as a time interval between successive coincidences of the stored tracking gates and like coincidences of the pulse repetition frequencies. This time interval is converted to a voltage proportional to range which is transferred to the range tracking loop of the system so as to properly establish initial conditions for this loop. A range tracking method is used in which time modulation is performed at a submultiple of the pulse repetition frequency to permit continuous tracking through many ambiguous periods. The range voltage measured in such a loop will correspond to true range provided initial conditions are established immediately upon the start of tracking by the means just mentioned.

In a system of the type described above, the tracking gate at a particular pulse repetition frequency will track the echo from a moving object until it becomes coincident with a transmitted pulse (i.e. eclipsing starts to occur). Eclipsing is occasioned by the necessity of employing a high repetition frequency which results in a condition wherein, as the target is tracked, the received echo, and hence the tracking gate, occurs during the interval that another pulse is being transmitted. To prevent receiver blocking or other undesirable transient effects, it is desirable to turn the receiver off during each transmitted pulse, but this implies loss of target information during the interval of eclipsing. To cope with the problem of receiver blocking, it has heretofore been proposed to incorporate memory in the range and velocity tracking loops of the system and rely on coasting through dead regions when the receiver is blocked. While this is adequate in many instances, it imposes limitations in some tactical situations, particularly a tail chase case of two aircraft of nearly equal performance.

It is an object of this invention to provide new and improved means in a pulse Doppler radar system employing multiple values of the pulse repetition frequency to prevent the transmitted pulse from being eclipsed by a received echo.

In accordance with the present invention, eclipsing is sensed by comparison of the synchronizing pulse used to generate the transmitted pulse of the radar system and the range tracking gate. When eclipsing occurs, a voltage is developed which controls two operations, namely:

(1) It momentarily blanks the receiver, and
(2) It switches the transmitted pulses from the radar system from one value of the pulse repetition frequency to another.

Since each of the values of the pulse repetition frequency employed are related by virtue of their derivation from a basic timing source, it will be readily apparent that when a target echo is eclipsed by a transmitted pulse at one value of the pulse repetition frequency it will not simultaneously be eclipsed at another value or values. Furthermore, the true range measuring technique has served to position the range tracking gate on the target returns in a manner such that the gate will remain on the target returns regardless of which of the values of the pulse repetition frequency is in use. Thus, when the pulse repetition frequency is switched as a result of an eclipse, the range tracking gate remains on the target returns but the transmitted pulse that was causing eclipsing effectively "moves" to a different position with respect to the target echo to thereby avoid eclipsings without disturbing continuous range tracking of the true echo.

The above and other objects and features of the invention will become readily apparent from the following detailed description taken in connection with the accompanying drawings which form a part of this specification, and in which:

FIGURES 1a and 1b, when placed end to end, form a schematic diagram of the radar system of the invention;

FIG. 2 is an illustration of waveforms appearing at various points in the circuit of FIGS. 1a and 1b;

FIG. 3 is a waveform illustrating the output waveshapes of the various range search and storage circuits of the invention;

FIGS. 4A–4D are waveforms graphically illustrating the operation of the range tracking loop of the circuit of FIGS. 1A and 1B.

Figure 5:
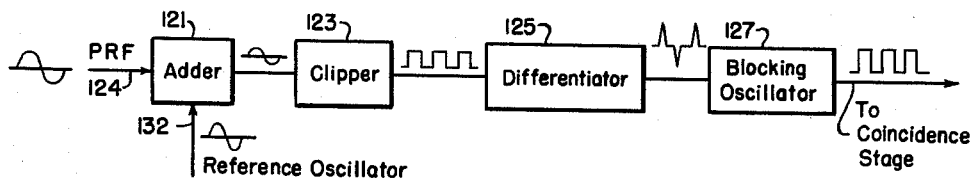
FIG. 5 is a detailed block diagram of the pulse shaper shown in FIG. 1b.
Figure 6A:
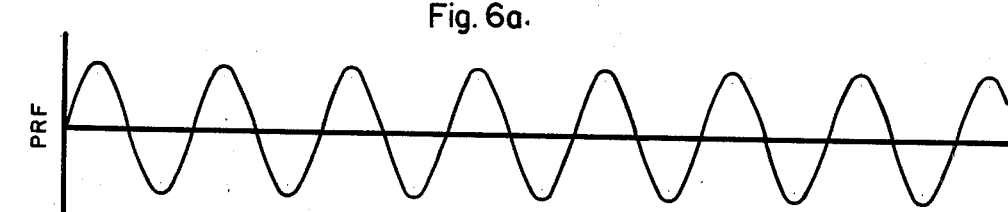
FIGS. 6a–6f are waveforms illustrating the operation of the circuit shown in FIG. 5.
Figure 6B:
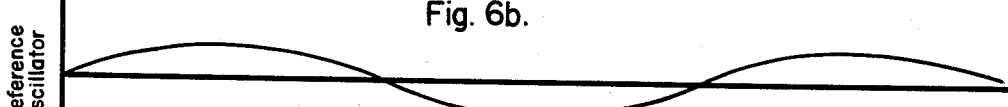
Figure 6C:
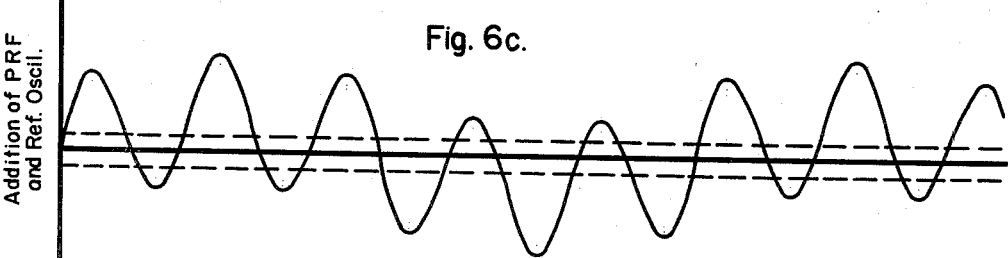
Figure 6D:
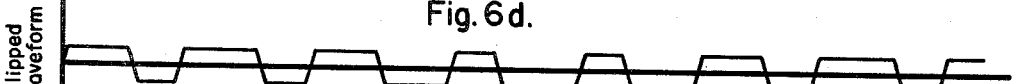
Figure 6E:
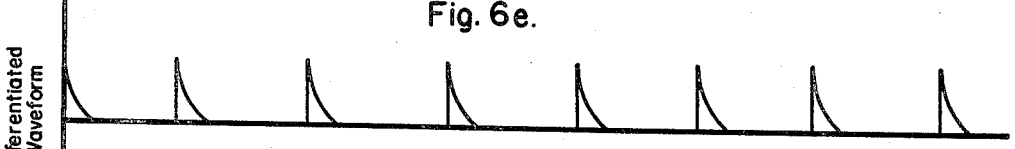
Figure 6F:
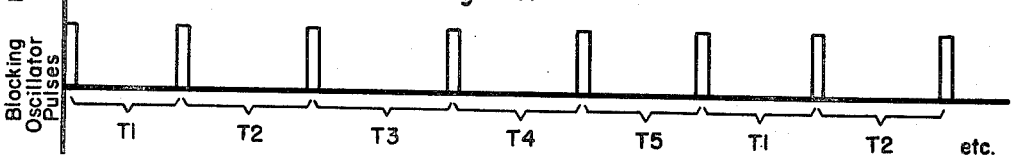

Referring to FIG. 1, the system shown comprises a transmitter 10 and a receiver-amplifier 12 coupled to a directional antenna 14 by a fast response and fast recovery duplexer 16. Two crystal oscillators 18 and 20 or equivalent frequency sources having different output frequencies are provided. The outputs of the oscillators are adapted to trigger a pulser 22 to generate pulses which periodically turn on a radio frequency amplifier comprising the transmitter 10. The transmitter is driven by a CW oscillator 33 which furnishes radio frequency energy for pulses transmitted from antenna 14. A sine wave from oscillator 18 is formed into pulses in pulse shaper 24. From shaper 24, pulses pass through line 26, normally closed contacts 28 of relay 30 and line 32 to pulser 22. Likewise, the sine wave from oscillator 20 is adapted to pass through pulse shaper 34, line 36, the normally open contacts 38 of relay 30 and line 32 to pulser 22. The pulsed energy from pulser 22 then permits the radio frequency carrier energy from oscillator 33 to be periodically amplified in transmitter 10.

Received energy pulses, after amplification in receiver 12, are applied to the control grid 40 of a pentode 42. The receiver shown in the present embodiment of the invention is simply an amplifier, but a superheterodyne arrangement could be used in which oscillator 33 is introduced into the first heterodyning process after translation by the intermediate frequency. Under normal conditions, the bias on the suppressor grid of pentode 42 is below cutoff. The alternating current voltage of the pulse envelopes applied to control grid 40 cannot initiate conduction in the tube unless a pulse is simultaneously applied to suppressor grid 44.

The voltage pulses applied to suppressor grid 44 are supplied from one of two time modulators 46 or 48. As is well known to those skilled in the art, a time modulator comprises a circuit adapted to produce a train of uniformly spaced output pulses having a pulse repetition frequency equal to the repetition frequency of input pulses, but shifted in phase with respect to the input pulses. As shown, pulses of the first repetition frequency are fed to time modulator 46 via line 50, and those of the other repetition frequency are fed to modulator 48 via line 52. The output pulses from the time modulators are positioned in phase with respect to the transmitted energy pulses from the radar system as a function of a direct current control voltage. This control voltage is fed to time modulator 46 via line 54 and to time modulator 48 via line 56. The output pulses from time modulators 46 and 48 appear on lines 58 and 60, respectively. Although a functional description only of the time modulators is given above, it should suffice for purposes of the present specification. However, a full and detailed description of the various types of time modulators may be found in Wave Forms, volume 19, M.I.T. Radiation Laboratory Series, by D. Sayre, McGraw-Hill Book Company, Inc., New York, 1949.

Under normal operating conditions the output pulses of time modulator 46 are applied to suppressor grid 44 of pentode 42 through the normally closed contacts 62 of relay 30, line 61, and the normally closed contacts 63 of relay 65. Output pulses from time modulator 48 are adapted to be applied to suppressor grid 44 through line 60, the normally open contacts 64 of relay 30, line 61 and the normally closed contacts 63 of relay 65.

The direct current control voltages for time modulators 46 and 48 are supplied from range sweep and storage circuits 6 and 68, respectively. The output of these circuits is a repetitive, linearly decreasing voltage somewhat like a saw-tooth waveform as shown in FIG. 3. One type of range search and storage circuit which may be used in the present invention is shown and described in copending application Serial No. 524,016, filed July 25, 1955, and assigned to the assignee of the present application, now Patent 2,879,503, dated March 24, 1959. For purposes of the present invention, however, it should be sufficient to state that the output voltage from the range search and storage circuits 66 and 68 will appear as the waveform shown in FIG. 3 until circuit 66 receives a stop search signal on line 67, or circuit 68 receives a stop search signal on line 69. At the instant when the range search and storage circuits receive a stop search signal (indicated by point 71 in FIG. 3), they will stop their linear rundown in voltage and maintain their output voltage substantially constant as shown. The stop signal search for range search and storage circuit 66 is supplied from a multivibrator 72, whereas the stop search signal for circuit 68 is supplied by a thyratron 74 which also supplies an enabling gate to a multivibrator 75 via line 77. As shown, multivibrator 72 is also adapted to control relay 30 through lead 76.

The radar transmitter 10 sends output pulses of radio frequency energy at a particular frequency. In accordance with well known Doppler theory, if these pulses of radio frequency energy should strike a stationary object, they will be reflected back to antenna 14 with the same frequency at which they were transmitted, assuming the radar set is stationary. If the radar set is mounted on a moving aircraft, the pulses of radio frequency energy which strike stationary objects will be received with a shift in frequency proportional to the speed of the aircraft. If the transmitted pulses strike a moving object however, they will experience a Doppler shift in frequency which is not proportional to the speed of the aircraft. It is desirable to separate the target returns of moving targets from those of stationary targets and to pass the moving target returns only to the range tracking portion of the system. To this end, coherent detector 78 is provided. Essentially, the coherent detector is a mixer which produces an output difference frequency. The target returns are mixed with the output of radio frequency oscillator 33 which is fed to the coherent detector 78 through line 80. Target returns from stationary targets will have substantially the same frequency as the transmitted signal; however, target returns from moving targets, having experienced a Doppler shift in frequency, will pass from the coherent detector 78 and through variable filter circuit 82. The filtering circuit employed is essentially a band pass filter, one possible embodiment of which is shown in copending application Serial No. 542,820, filed October 26, 1955, and assigned to the assignee of the present application.

The output of variable filter means 82 will be a signal of a particular intermediate frequency indicating the existence of a moving target. This signal is applied to the grid 84 of a triode 86 which is normally biased to form a threshold to prevent the passage of random noise signals. The output of the triode for a signal from variable filter circuit 82 of sufficient amplitude is, in turn, applied through line 88 and the normally closed contacts 90 of relay 30 to multivibrator 72. The signal from triode 86 is also adapted to be applied through the normally open contacts 91 of relay 30 to grid 92 in thyratron 74 which is normally held cut off by a negative voltage applied to the grid 92. The output of coherent detector 78 is also applied through line 94 and the normally closed contacts 96 of relay 98 to a bank of filters 100. Signals passing through one or more of the filters in the filter bank 100 overcome a bias on the threshold detector arrangement 102 to produce an output signal. This signal has two functions:

(1) It commands the antenna servo 104 to cease a general scanning motion and pause preparatory to eventually assuming a tracking function wherein the antenna 14 follows a particular target; and (2) It actuates relay 98 to open contacts 96 and close contacts 106 and 107.

When contacts 106 close the output of coherent detector 78 is applied to a velocity tracking circuit 108 which functions to eventually cause the antenna servo motor 104 and antenna 14 to track or follow a moving target by supplying an appropriate error signal which is produced by lobing or conically scanning the feed horn of antenna 14 by suitable means, not shown. Tracking circuits of this type are well known in the art.

Referring again to crystal oscillators 18 and 20, the outputs of these two circuits are applied to a mixer circuit 110 which produces a sine wave output signal having a frequency equal to the difference of the frequencies of oscillators 18 and 20. This difference signal is applied through a phase shifter 112 to a pulse shaper 114 which produces substantially square wave output pulses at the difference or fundamental frequency. The output pulses of pulse shaper 114 are applied as synchronizing pulses to a time modulator 116 which functions in substantially the same manner as time modulators 46 and 48.

The range tracking portion of the system will now be described. It will be seen from the following description that range tracking is accomplished through the use of a reference oscillator which causes the range gates to move back and forth slightly (or jitter) in a prescribed and periodic manner over a small time increment in the vicinity of the received echo. When the range gate is slightly off-center of the target returns, this time jitter causes a modulation of the signal output in an amount which provides an appropriate correction voltage. Essentially, the system is the familiar type of phase detection where errors result in an output signal whose amplitude is proportional to the error and whose phase depends upon the sense of the error. A velocity correction voltage derived from the velocity tracking circuit 108 by means of contacts 107 of relay 98 and lead 109 is used to give the loop memory during fading. Alternatively, a double integrator could be used in the loop as in conventional pulse Doppler range tracking arrangements rather than the velocity correction voltage employed herein.

The output pulses of time modulator 116 are passed through two frequency multipliers 118 and 120. Frequency multiplier 118 increases the frequency of the output pulses of time modulator 116 to substantially that of the signal generated by crystal oscillator 18; whereas frequency multiplier 120 increases the fundamental frequency of the output of the time modulator to the second pulse repetition frequency generated by crystal oscillator 20. The resulting output pulses from frequency multiplier 118 are applied through normally closed contacts 122 of relay 30 and line 124 to pulse shaper 126. Likewise, the resulting output pulses from frequency multiplier 120 are adapted to be applied through normally open contacts 128 of relay 30 and line 124 to pulse shaper 126. The duration of the pulses from pulse shaper 126 are of the same order of time as those from transmitter 10. The output of reference oscillator 130 is applied via line 132 to pulse shaper 126 in some convenient manner to jitter the time position of pulses passing therethrough. That is, it causes the pulses from frequency multiplier 118 or 120, as the case may be, to oscillate back and forth over a time interval equal to a fraction of the pulse width of the pulses from the frequency multiplier.

Details of the pulse shaper 126 are shown in FIGS. 5 and 6. The signal from frequency multiplier 118 or 120 on line 124 is added with that from reference oscillator 130 on line 132 in an adder circuit 121. The output of the adder is then passed through a clipper circuit 123 and a differentiator 125 to a blocking oscillator 127. The signal from the frequency multiplier 118 or 120, and that from reference oscillator 130, is shown in FIGS. 6a and 6b, respectively. These signals are added in circuit 121 to produce the waveform shown in FIG. 6c. The clipping levels of the clipper 123 are shown by the dotted lines in FIG. 6c so that the clipped output waveform from circuit 123 will appear as the waveform shown in FIG. 6d. The clipped waveform is then passed through differentiator 125 to produce the waveform shown in FIG. 6e, and this waveform is, in turn, passed through blocking oscillator 127 to produce a series of unequally spaced output pulses shown in FIG. 6f. The pulses shown in FIG. 6f occur at the original pulse repetition frequency but are phase modulated by the reference oscillator 130. This is indicated by the unequal time periods $T_1$, $T_2$, $T_3$, $T_4$ and $T_5$, changing at the reference frequency and then becoming completely periodic again at a time equal to the sum of $T_1+T_2+T_3+T_4+T_5$.

The output pulses from pulse shaper 126 are passed to a coincidence stage 134 where they are compared with the transmitted pulses from pulser 22. If the pulses from pulser 22 should coincide with those from pulse shaper 126, the coincidence stage 134 will produce an output voltage on line 136 which is fed to an eclipse detector 138. If an eclipse is detected (i.e., if the output pulses from pulser 22 coincide with those from the pulse shaper 126), the eclipse detector 138 will momentarily blank or cut off receiver 12 and will actuate a relay 140. As shown, the relay 140 has a pair of normally closed contacts 142 which ground line 144, and a pair of normally open contacts 146 which are adapted, when closed, to connect line 144 to a source of voltage, such as battery 148. As shown in FIG. 1A, line 144 is connected to a relay 150 having a pair of normally closed contacts 152 in the energizing circuit of relay 30. Thus, when relay 140 is energized upon coincidence of a pulse from pulser 22 with a pulse from pulse shaper 126, contacts 146 will close to energize relay 150, thereby opening contacts 152 and breaking the energizing circuit for relay 30.

The output pulses from pulse shaper 126 are also adapted to be applied through line 154 and normally open contacts 156 of relay 65 to grid 44 of pentode 42. If it is assumed that relays 65 and 98 are energized, and contacts 156 and 106 are closed, then the output pulses from pulse shaper 126 on grid 44 of pentode 42 will be adapted to coincide with target returns from receiver 12 on grid 40 to produce an output from the pentode which passes through coherent detector 78, line 94, contacts 106, velocity track circuit 108, amplitude detector 111 and line 158 to an error signal filter 160. From error filter 160 the signal passes through an error amplifier 162 to a phase detector 164 which compares the phase of the signal from amplifier 162 with that from reference oscillator 130. An output signal results with an amplitude which is proportional to the difference in phase between the two signals fed into the detector and whose polarity depends upon whether or not the signal from amplifier 162 is leading or lagging that from reference oscillator 130. The output signal from phase detector 164, being a slowly varying direct current signal, passes through an integrator 166 and function unit 168 to the time modulator 116. Function unit 168 merely serves to connect to the time modulator 116:

(1) The signal from integrator 166,
(2) The signal from a range search and storage circuit 170, and
(3) A voltage proportional to velocity from the velocity track 108 via contacts 107 of relay 98 and line 109.

The signal from phase detector 164 or range search and storage circuit 170, as the case may be, serves to position the output pulses from time modulator 116 in phase in much the same way that the signals from circuits 66 and 68 serve to position the output pulses of time modulators 46 and 48, respectively, except that time modulation is here performed at a lower or different frequency.

In FIG. 1A, it can be seen that the output pulses of time modulators 46 and 48 are applied via lines 171 and 172, respectively, to grids 174 and 176 in a first coincidence detector 178. When the pulses on line 171 from time modulator 46 coincide with those from time modulator 48 on line 172, coincidence detector 178 will produce an output pulse which is applied to the grid 180 of a second coincidence detector 182. The output pulses of time modulator 116 are applied via line 184 to the other grid 186 of the second coincidence detector 182. Thus, when an output pulse from coincidence detector 178, signifying coincidence of a pulse from time modulator 46 with a pulse from time modulator 48, coincides with an output pulse from time modulator 116, the coincidence detector 182 will conduct to trigger a multivibrator 75 which has already been enabled by the triggering of thyratron 74. When the multivibrator is triggered, it energizes relay 65 via line 190 and also applies a signal via line 192 to range search and storage circuit 170 to cause the output of this circuit to stop its linear rundown and hold its voltage at a point similar to that of point 71 shown in FIG. 3.

Operation of the invention may best be understood by reference to FIGS. 2-4 which illustrate waveforms appearing at various points in the circuit of FIGS. 1A and 1B. The waveforms of FIG. 2 are identified by letters, and the points at which these waveforms appear in FIGS. 1A and 1B are indicated by like reference letters.

Under normal conditions, when the radar system is searching for a moving target, the crystal oscillator 18 is connected to pulser 22 through pulse shaper 24, line 26, normally closed contacts 28, and line 32. Antenna 14 will be moved through a scanning pattern by antenna servo 104, and the contacts of all the relays will be in the positions shown. The signal of the first pulse repetition frequency transmitted from the transmitter 10 appears as waveform A in FIG. 2. It consists of a series of spaced pulses of radio frequency energy at the first pulse repetition frequency, in this case approximately 120 kilocycles. When the radar beam intercepts a target, the envelope of the alternating current signal from receiver 12 will appear as waveform B. As each pulse is transmitted, a certain amount of radio frequency energy will be detected to the receiving portion of the antenna 14 and will be detected by the receiver of the system. Hence, a series of pulses X1, X2, X3, etc. (called "main bangs") will appear in the waveshape. Reflected energy pulses from a target are indicated by pulses Y1, Y2, Y3, etc. The pulse repetition rate of the transmitted pulses is such that two or more pulses will be transmitted from the system before a reflected echo from the target can return to the antenna. This is done to facilitate high speed targets, and in this manner the present system differs from a conventional radar system wherein the echo from one transmitted pulse is received by the system before the next subsequent pulse is transmitted. Thus, it is not apparent from an examination of the waveform B whether received pulse Y1, Y2 or Y3 is a reflected pulse of transmitted pulse X1. The pulses Y1, Y2 and Y3 will always be substantially equidistant (neglecting movement of the target) since their corresponding transmitted pulses are equidistant. For purposes of the present explanation, it will be assumed that Y2 is a reflected pulse of X1. Consequently, the distance $\phi$ indicates true range.

Before a target is detected by the system, multivibrator 72 will apply a potential to range search and storage circuit 66 to permit it to produce a saw-tooth output waveform similar to that shown in FIG. 3. Thyratron 74, being normally non-conducting by virtue of a cutoff potential applied to its grid 92, will cause range search and storage circuit 68 to range search but without the property of storage due to open contact 91, thereby rendering it inoperative. Multivibrator 75 will be disabled by the same non-conducting plate of the thyratron 74. The output pulses of time modulator 46, having a pulse repetition frequency equal to that of the transmitted pulses by virtue of the time modulator connection to crystal oscillator 18, will be periodically swept over a range equal to the distance between successive transmitted pulses. The sweeping output of time modulator 46, moving from left to right, will appear as waveform C in FIG. 2. These pulses are applied by normally closed contacts 62 of relay 30, line 61, and normally closed contacts 63 of relay 65 to grid 44 of pentode 42.

When a true target is detected by the system, and the target returns shown in waveform B coincide with the moving pulses in waveform C in petode 42, the pentode will conduct to produce an output signal which passes through coherent detector 78 and variable filter means 82 to the grid 84 of triode 86. The output of the triode is, in turn, applied through line 88 and normally closed contacts 90 of relay 30 to multivibrator 72. The multivibrator 72 is, therefore, switched from one stable state to the other; and it applies a stop search potential to range search and storage circuit 66. This causes the range search and storage circuit to maintain its output voltage constant with a velocity correction introduced by the voltage applied from velocity tracking circuit 108 through contacts 107 of relay 98 and line 109, in accordance with the explanation given above. As a result, the output voltage pulses from time modulator 46 are maintained at a constant phase position plus a small velocity correction to remain in coincidence with the return target signals as shown by waveform D in FIG. 2.

The output from multivibrator 72 also actuates the relay 30 to reverse the position of its contacts. Consequently, crystal oscillator 18 is now disconected from pulser 22 since contacts 28 are now open; and crystal oscillator 20 is connected to pulser 22 through pulse shaper 34, line 36, contacts 38 and line 32. A signal of a second pulse repetition frequency, shown as waveform A' in FIG. 2 is now transmitted from the system. For illustrative purposes, five pulses at the second pulse repetition frequency are shown transmitted over a time interval during which six pulses at the first pulse repetition frequency were transmitted. Return echoes at the second pulse repetition frequency are now applied to the control grid 40 of pentode 42. However, time modulator 48 is now connected to suppressor grid 44 via line 60, contacts 64, line 61, and contacts 63. Furthermore, range search and storage circuit 68 is rendered operative by virtue of the fact that the grid 92 of thyratron 74 is connected to a source of negative bias potential and no signal is received through contacts 91 and line 88. Range search and storage circuit 68 will therefore apply a repetitive saw-tooth waveform to time modulator 48 which will, in turn, supply a series of output pulses (waveform C') at the second pulse repetition frequency which are periodically swept over a range equal to the distance between successive transmitted pulses at the second pulse repetition frequency. These pulses are applied via line 60, contacts 64, line 61, and contacts 63 to grid 44 in pentode 42. When the pulses from modulator 48 on grid 44 coincide with the target returns on grid 40 at the second pulse repetition frequency, the pulses which pass through coherent detector 78, variable filter means 82, triode 86, and contacts 91 to grid 92 in thyratron 74, turn on the thyratron thereby stopping the linear rundown in voltage of range search and storage circuit 68. Conduction in the thyratron also enables multivibrator 75. The range search and storage circuit will then hold its output voltage constant with a velocity correction supplied on line 109, and the output of the time modulator 48 will appear as waveform D' in FIG. 2 where the pulses coincide with the target returns of waveforms B'.

The waveforms D and D' are applied via lines 171 and 172 to grids 174 and 176 in coincidence detector 178. When these pulses coincide, they will produce output pulses substantially similar to those shown by waveform E in FIG. 2. The difference frequency output of pulse shaper 114 will appear as waveform F in FIG. 2. These pulses are applied to time modulator 116. The output of range search and storage circuit 170 which is normally applied to the time modulator 116 causes the output pulses from the time modulator, at the fundamental frequency, to move from left to right over a time interval equal to the distance between successive pulses from pulse shaper 114 as shown by waveform G in FIG. 2. When the output pulses from time modulator 116 reach the position shown by the dotted lines on waveform G they will coincide with the output pulses (waveform E) from coincidence detector 178. Since these pulses are applied to grids 186 and 180 in coincidence detector 182, the detector will conduct when the pulses in waveforms E and G coincide to trigger multivibrator 75 to change from one stable state to the other. The multivibrator thus applies a stop search signal to range search and storage circuit 170 to cause time modulator 116 to hold the phase position of its output pulses constant with velocity correction from velocity tracking circuit 108 at the position shown by the dotted lines in waveform G. In addition, multivibrator 75 will not energize relay 65 through line 190, thereby opening contacts 63 and closing contacts 156.

Since at this time a target has been detected and relay 98 is, therefore, energized, contacts 106 of relay 98 are closed, and a closed tracking loop is completed through pulse shaper 126, contacts 156, pentode 42, coherent detector 78, contacts 106, velocity track circuit 108, amplitude detector 111, line 158, filter 160, amplifier 162, phase detector 164, integrator 166, function unit 168, time modulator 116, frequency multiplier 120, contacts 128 of relay 30, and line 124.

After the output pulses from time modulator 116 (waveform G) are positioned over the true target returns, they will remain in that position unless a direct current error voltage from phase detector 164 is fed into the time modulator 116. In order to sense a change in range of the target, the output pulses from frequency multiplier 120 are time jittered in a regular manner in pulse shaper 126. This process is shown graphically in FIG. 4. The output pulses from frequency multiplier 120 will be identically the same as those of waveform D′ shown in FIG. 2 wherein each pulse of waveform D′ coincides with a target return in waveform B′. In order to provide an automatic range tracking system, it is necessary to provide means for sensing a change in the phase position of the target returns in waveform B′ with respect to the pulses in waveform D′ from frequency multiplier 120.

In FIG. 4 it can be seen that successive output pulses 200 of frequency multiplier 120 are jittered or periodically shifted in phase over a time interval equal to a fraction of the pulse width. Since the output pulses from pulse shaper 126 and the target returns from receiver 12 are compared in pentode 42, the output energy from pentode 42 will depend upon the degree of coincidence between the pulses from pulse shaper 126 on grid 44 and the target returns on grid 40. In FIGS. 4a–4d the target returns are all indicated generally by 202. Obviously, the energy output of pentode 42 will be greatest when there is exact coincidence between the pulse 200 from pulse shaper 126 and the target return 202. As pulse 200 is moved to the right, the energy output of pentode 42 will drop until the pulses 200 and 202 no longer coincide at which time the energy output of the pentode 42 will be zero. As pulses 200 move to the left, the energy level will then increase from zero to a maximum at exact coincidence and then back to zero when the pulse 200 has moved to the left to a sufficient degree so that the target and tracking pulses no longer coincide. In operation, reference oscillator 130 will cause the pulses 200 to first move to the right in an amount equal to a fraction of the pulse width, as shown by the dotted line in FIG. 4b and will then cause the pulse 200 to move back through dead center to the left in an amount equal to a fraction of the pulse width as shown by FIG. 4c. In FIG. 4a it can be seen by the solid line curve 204 that at the beginning of the cycle when the pulses 200 and 202 coincide exactly, the energy output of pentode 42 will be at a maximum. When the pulse 200 moves to the position shown by the dotted lines in FIG. 4b the energy level will fall to one-half of its original value since the pulses now coincide by only one-half. Then pulse 200 will move back through dead center, at which time the energy level again reaches a maximum. When the pulse 200 moves to the left as shown in FIG. 4c by one-half pulse width, the energy level again falls to one-half and then increases to a maximum when the pulse 200 moves back to dead center to complete the cycle. It can thus be seen that as the pulse 200 moves through one cycle when the target return 202 and the output of frequency multiplier 120 are exactly coincident, the output energy level of pentode 42 will pass through two cycles. The frequency of the output signal of pentode 42 is passed through the range tracking circuit to phase detector 164 which is adjusted with respect to reference oscillator 130 to produce zero output error voltage when this condition exists (i.e., when the output of pentode 42 passes through two cycles as reference oscillator 130 and pulse shaper 126 pass through one cycle).

Now it will be assumed that the return target pulse 202 and pulse 200 are no longer coincident but that pulse 202 has moved to the right by one-half the pulse width as shown in FIG. 4d. The resulting energy versus time curve is shown by the dotted line 206 in FIG. 4a. Now, when pulse 200 first moves to the right, the energy level of the output of pentode 42 will increase from one-half its maximum value to a maximum. Then, as pulse 200 moves to the left the energy level will fall until the pulse 200 reaches its extreme left position, at which time the pulses 200 and 202 will no longer be coincident and the energy level will fall to zero. At the completion of the cycle, the energy level will again rise to one-half its maximum value. As will be understood, if the pulse 202 moves to the left rather than to the right, a wave-form such as that shown by dotted line 208 in FIG. 4a will be produced.

It should be apparent from the foregoing that as the target moves in range and the target returns change their phase position relative to the output pulses of frequency multiplier 120, the phase of the error frequency from pentode 42 fed to the phase detector 164 will be materially changed. The amount to which the phase changes will, of course, depend upon the change in range of the target. The phase detector 164 will produce an output current whose magnitude is proportional to the phase deviation and whose polarity depends upon the relative phase sense of the signal coming from pentode 42. This output current is applied through single integrator 166 and function unit 168 to time modulator 116 to again position the output pulses 200 from frequency multiplier 120 over the target returns 202. In this manner the output pulses from frequency multiplier 120 will effectively "follow" the target returns and the output voltage from integrator 166 fed to time modulator 116 will be proportional to the true range of the target. This tracking is assisted by a velocity voltage from the velocity track administered via the function unit 168 and lead 109.

The process just described will continue until the returned target echo at the second pulse repetition frequency coincides with a transmitted energy pulse at the second pulse repetition frequency. At this point the output pulses from pulse shaper 126 at the second pulse repetition frequency will coincide with the output pulses from pulser 22 in coincidence stage 134 to actuate eclipse detector 138 which may, for example, be a monostable multivibrator. The detector 138 will then energize relay 140. Thus, contacts 142 of relay 140 open and contacts 146 close to energize relay 150 and break the energizing circuit for relay 30. Thus, relay 30 becomes deenergized and its contacts assume the position shown in FIG. 1A. Under these conditions, frequency multiplier 120 is no longer connected to pulse shaper 126 since contacts 128 are open. However, frequency multiplier 118 is connected to the pulse shaper through contacts 122. Pulses of the first pulse repetition frequency are now transmitted from the system by virtue of the fact that pulse shaper 24 is now conneced to pulser 22 through contacts 28. It should be readily apparent that *both* the returned target echoes and the output pulses from pulse shaper 126 shift in phase so that they will *still coincide* and the tracking process may be carried on at the first pulse repetition frequency in the same manner as was previously described. Tracking will continue at the first pulse repetition frequency until an eclipse is again detected, at which time the eclipse detector 138 will deenergize relay 140. This in turn causes relay 150 to become deenergized and relay 30 to become energized. In this manner the pulse repetition frequency will shift from one value to the other as eclipsing occurs, but range tracking will take place normally regardless of which pulse repetition frequency is used by virtue of the fact that the two pulse repetition frequencies are interrelated by a fundamental frequency and time modulator 116 has previously been set to the proper condition by range search and storage circuit 170 as controlled through coincidence stage 182 in the manner previously described.

A refinement of the method described above consists of arranging switching relays 140 and 150 so that they are activated by eclipse detector 138 only when the velocity voltage from velocity track circuit 108 falls below a predetermined value. Thus, PRF switching to prevent eclipsing is used only on relatively slower speed targets where it is needed. On extremely high speed targets, no PRF switching is used since the target may pass through an eclipse condition in a negligible amount of time (i.e., 0.1 second).

Although the invention has been described in connection with a certain specific embodiment, it should be readily apparent to those skilled in the art that various changes in form and arrangement of parts can be made to suit requirements without departing from the spirit and scope of the invention.

I claim as my invention:

1. In a radar system, a source of energy pulses having a first repetition frequency, a source of energy pulses having a second repetition frequency, means for transmitting energy pulses of said first repetition frequency, means for receiving transmitted energy pulses reflected from a distant object, means for producing a train of voltage pulses having a repetition frequency equal to the difference between said first and second repetition frequencies, means for changing the repetition frequency of said train of pulses to said first pulse repetition frequency, means for positioning the train of pulses at said first repetition frequency to correspond in phase with received energy pulses at said first repetition frequency reflected from a distant object, means for detecting phase coincidence of pulses in said train of pulses with energy pulses transmitted at the first repetition frequency, and means responsive to the output of said detecting means for causing said transmitting means to transmit energy pulses of said second repetition frequency and for changing the repetition frequency of said train of pulses to said second repetition frequency.

2. In a radar system, a source of energy pulses having a first repetition frequency, a source of energy pulses having a second repetition frequency, means for transmitting energy pulses of said first repetition frequency, means for receiving transmitted energy pulses reflected from a distant object, means for producing a train of voltage pulses having a repetition frequency equal to the difference between said first and second repetition frequencies, an automatic range tracking device including means for changing the repetition frequency of said train of pulses to said first repetition frequency, means included in said range tracking device for positioning the train of pulses at said first pulse repetition frequency to correspond in phase with received energy pulses at said first repetition frequency reflected from a distant object, means for detecting phase coincidence of pulses in said train of pulses at the first repetition frequency with energy pulses transmitted at said first repetition frequency, and means responsive to the output of said detecting means for causing said transmitting means to transmit energy pulses of said second repetition frequency and for causing said range tracking device to change the repetition frequency of said train of pulses to said second repetition frequency.

References Cited in the file of this patent

UNITED STATES PATENTS 2,419,541    De Rosa   _____ Apr. 29, 1947